Sept. 2, 1924.
J. B. MERIAM
1,507,242
DEVICE FOR WEIGHING THE LOAD ON VEHICLE WHEELS
Filed Oct. 14, 1920
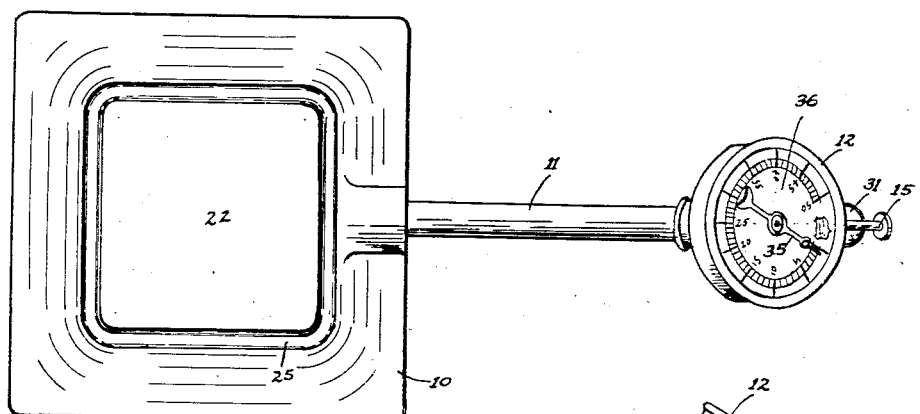
Fig-1
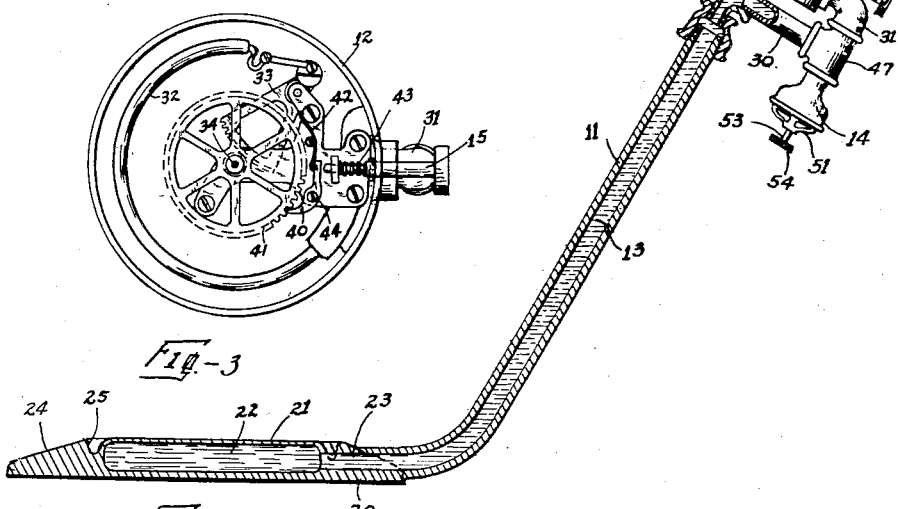
Fig-3
Fig-2
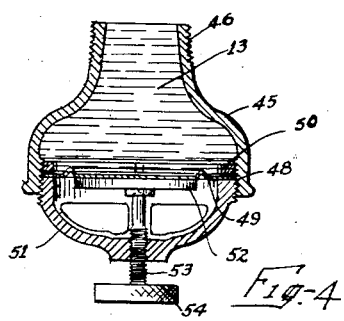
Fig-4
Inventor
Joseph B. Meriam,
By Bates & Macklin,
Attorneys Patented Sept. 2, 1924.

1,507,242

UNITED STATES PATENT OFFICE.

JOSEPH B. MERIAM, OF CLEVELAND, OHIO.

DEVICE FOR WEIGHING THE LOAD ON VEHICLE WHEELS.

Application filed October 14, 1920. Serial No. 417,000.

*To all whom it may concern:*

Be it known that I, JOSEPH B. MERIAM, a citizen of the United States, residing at Cleveland, in the county of Cuyahoga and State of Ohio, have invented a certain new and useful Improvement in Devices for Weighing the Load on Vehicle Wheels, of which the following is a full, clear, and exact description, reference being had to the accompanying drawings.

This invention relates to a portable scale for determining the wheel load of a vehicle such as an automobile truck. Scientifically, the limit of load which a truck should be allowed to carry is not the gross weight of the truck and load, but the maximum downward pressure at any wheel, i. e., the wheel load, since an excessive pressure by any wheel damages the road bed. Laws and ordinances prescribing a wheel load limit are very desirable as it is possible especially with heavy machinery to so position a load that one wheel carries a much greater portion of the weight than another wheel, as under such a condition the road or pavement over which the truck travels is subjected to the concentrated load, and the result is that the pavement is broken and the road bed distorted.

One of the objects of my invention is to provide a load measuring device over which a truck may be driven to register the wheel load thereof. Another object is to provide a portable device which may be carried on the truck for the convenience of the truck driver, or which may be carried on a motorcycle to aid in enforcing the laws which govern loading regulations.

The accomplishment of the above and other objects will be hereinafter described in detail with relation to the accompanying drawings. The essential characteristics are set forth in the claims.

In the drawings Fig. 1 is a plan of a platform and indicator embodying the features of my invention; Fig. 2 is a section partly in elevation thru the center of the platform; Fig. 3 is a plan of the indicating mechanism; Fig. 4 is a section thru a regulator.

Designating the parts by the use of reference characters 10 represents the base or platform, over which a wheel may pass, connected by a tube 11 to an indicator 12. A non-compressible fluid 13 may connect the platform with the indicator and an adjustment for variation in the fluid pressure is provided for by the regulator 14. A suitable maximum pressure registering device is associated with the indicator 12, the releasing lever therefor being indicated at 15.

The base 10 preferably comprises a heavy base plate 20, with a corrugated flexible plate 21, rigidly secured, as by welding, thereto. The plates 20, 21 are spaced apart to provide a chamber 22 and a passage 23 leading therefrom is provided for attaching the tube 11 to the base 10. The margin of the base 10 is preferably beveled as at 24 to provide an inclined approach or ramp for the wheel of a truck. The plate 21 serves as a diaphragm adapted to be pressed downwardly by the weight of the wheel. To produce a resilient yet strong diaphragm I prefer to so construct the plate that one or more corrugations 25 extend around the periphery of the diaphragm, thereby adding to the flexibility.

I have shown the fluid 13 as a connecting means between the platform 10 and the indicator 12 but any well known connecting means such as springs and levers may be employed to effect the same result. The tube 11 may have one end thereof threaded or welded to the base 10, while the other end is provided with suitable fittings for attaching the indicator 12. I have shown the tube 11 as attached to the platform 10 by a short length of pipe which is inclined to the base at an angle of about 60°; but obviously the inclination of the tube may be any amount to prevent the hub of the truck from striking the indicator, as a wheel is passing over the platform.

The indicator 12 connected to the tube 11, thru the fittings 30, 31, may be provided with any suitable registering device capable of visibly indicating variations in pressure of the fluid 13. In Fig. 3 I have shown an indicator having a bent tube 32 connected thru the sector 33 to the indicator shaft 34. An indicator 35 may be secured to the shaft 34, while the dial 36 associated with the indicator is preferably marked to register in tons and fractions thereof.

When a truck wheel passes over the diaphragm 21 the indicator 34 registers the pressure exerted on the fluid 13, and then drops back to zero, as soon as the truck leaves the platform. To allow a truck to move over the platform, and at the same time to accurately register the variations in fluid pressure within the tube 11, I provide a maximum pressure indicating mechanism; and as shown this comprises a spring actuated detent 40 and a gear 41 rigid with the shaft 34. The spring 42 constantly urges the detent 40 against the teeth of the gear 41, and permits movement of the gear in one direction. To release the detent 40 I provide a rod 15 slidably mounted in the outer wall of the indicator 12, which may be pressed against one end of the detent to cause disengagement with the gear. A spring 43 constantly urges the rod 15 outwardly from the wall of the indicator thereby permitting the detent to move freely on the pivot 44.

The pressure of the fluid within the tube 11 may vary according to changes in temperature and with the degree of tightness of the fittings connecting the indicator with the platform. To regulate the indicator 34, and to compensate for the change in pressure I provide the regulator 14, which, as shown in Fig. 4 comprises the fitting 45 having an external thread 46 for engaging the T 47, and an internal thread 48 for engaging a diaphragm. Within the fitting 45 I provide a diaphragm 49 which bears against the plate 50 and is held thereagainst by the bracket 51. The diaphragm 49 is preferably a corrugated plate, the periphery of which, is sealed between the plate 50 and the bracket 51, while the center portion thereof is adapted to be compressed by the plate 52. A rod 53 passes thru the arms of the bracket 51 and has a thumb screw 54 which may be turned to rotate the rod, thereby moving the diaphragm and varying the pressure of the fluid.

Assuming that the wheel of a truck passes over the diaphragm 21, then the wheel load depresses the diaphragm and causes the liquid within the fluid chamber to pass thru the tube 13 and into the tube of the indicator. The tube 32 tends to straighten out when pressure is applied internally thereof, thereby causing the sector 33 to rotate the shaft 34 with the indicator arm 35. The detent 40 permits the gear 41 to rotate when the indicator arm is registering an increase of fluid pressure, but does not permit it to rotate when the pressure decreases. With such an arrangement the wheel load may be determined while the truck is passing slowly over the platform. To release the indicator arm 35 it is only necessary to press the rod 15 inwardly until the inner end thereof abuts the detent, whereupon the gear 41 is released and the indicator arm recedes to the zero point of the dial.

From the foregoing description it will be seen, that I have provided a device capable of indicating the wheel-load of a truck, and that such a device may be a portable mechanism adapted to be readily positioned or carried as part of the accessory to an automobile truck. Where legislation is enacted to govern the wheel load of trucks, my device may be profitably carried on a motorcycle by a police officer and employed to aid in enforcing the wheel-load regulation. My device is also simple, durable and capable of being cheaply manufactured.

Having thus described my invention, I claim:—

1. In a scale, the combination with a portable platform having a low height and having lateral dimensions for permitting only one wheel of a truck to be driven thereon at one time, said platform having a yielding wall, a ramp associated with the platform and disposed in front thereof, an indicator disposed at the side of the platform, and means for communicating motion from the yielding wall to the indicator.

2. In a scale, the combination with a portable platform having an inclined approach and having a chamber therein, of a diaphragm carried by the platform and disposed across said chamber, said diaphragm being adapted to support the wheel load of a motor vehicle, an indicator, a tube connecting the chamber with said indicator, a non-compressible fluid within the chamber and tube and means for manually adjusting said indicator.

3. In a scale, the combination with a portable platform having a chamber therein and having a ramp on opposite sides thereof, of a diaphragm carried by the platform and comprising a wall of said chamber, said diaphragm being adapted to support the wheel load of a motor vehicle, an indicator, a tube connecting said indicator with said chamber, a non-compressible fluid within the chamber and tube, and means for manually regulating the fluid pressure.

4. In a scale, the combination with a platform having an inclined portion extending upwardly from the edges thereof and having a chamber therein, of a diaphragm comprising one wall of said chamber, an indicator, means connecting the indicator with said chamber, said means including a non-compressible fluid, and other means for manually varying the fluid pressure.

5. In a portable scale, the combination with a platform having a chamber therein, and having a diaphragm comprising the top surface of said platform, and indicator, a tube connected at one end to the indicator, and at the other end to the platform adjacent said chamber, a non-compressible fluid within the chamber and tube, and a fluid pressure regulator.

6. In a portable scale, the combination with a platform having a ramp on opposite sides thereof and having a chamber therein, of a diaphragm carried by the platform across said chamber, an indicator, a non-compressible fluid connecting the chamber with the indicator, means for manually varying the pressure of said fluid and means for indicating the maximum pressure that may be exerted by a load on the diaphragm.

7. In a scale, a portable platform comprising a substantially rectangular base portion having a ramp integral therewith and serving as an approach, and a diaphragm positioned substantially at the center of platform, whereby a load may be rolled up the ramp and be deposited directly on the diaphragm.

8. In a scale, a platform having a substantially flat base portion, and an upper portion, the said upper portion comprising a plate, the center of the plate being separated from the base and the ends of the plate being rigid with the base, said base portion comprising a ramp.

9. In a portable scale, a platform having a pair of oppositely disposed ramp portions and having a diaphragm disposed intermediate said ramp portions, the space beneath said diaphragm being hollow, an arm communicating with said space and extending in a direction transversely to the ramp, an indicator carried at the free end of said arm, and a non-compressible fluid within the space beneath said diaphragm and within the arm for actuating said indicator when a load is placed upon said diaphragm.

10. In a portable scale, the combination with a platform having an inclined approach and having a chamber therein, of a diaphragm forming a wall for said chamber and comprising a support for the wheel of an automobile truck, an indicator having an arm carried thereby, a non-compressible fluid connecting said chamber with said indicator, means for retaining the indicator arm at the point of maximum pressure on the indicator, and means for regulating the pressure of said fluid.

11. In a scale, the combination with a platform having a chamber therein, of a tube extending obliquely from the platform and communicating with said chamber, an indicator carried by the end of the tube remote from the platform, a non-compressible fluid in said tube and chamber, a diaphragm comprising a wall of said chamber and the top surface of the platform, and a pressure indicator comprising a diaphragm, an adjusting screw and a retaining bracket.

12. In a scale, the combination with a portable platform having a chamber therein, of a diaphragm forming a wall of said chamber and adapted to support the wheel load of an automobile truck, an indicator having an arm carried thereby, a fluid connecting said chamber with said indicator, and means comprising a gear and detent for permitting movement of the indicator arm in only one direction.

13. In a scale, the combination with a portable platform, having a fluid reservoir therein, an indicator, means connecting the reservoir with the indicator, means for registering maximum pressure on the indicator comprising a gear, a pivoted detent and a spring actuated rod adapted to abut one end of said detent.

14. In a scale, the combination with a portable platform having a comparatively low height, and having lateral dimensions for permitting only one wheel of a truck to be driven thereon at a time, said platform comprising a yielding top wall and a pair of ramps associated with the opposite edges of the top wall, an indicator positioned at the side of the platform, and operating mechanism connecting said yielding wall with said indicator.

In testimony whereof, I hereunto affix my signature.

JOSEPH B. MERIAM.